United States Patent [19]

Garcia

[11] Patent Number: 5,323,078
[45] Date of Patent: Jun. 21, 1994

[54] PERMANENT MAGNET ROTOR, AND A MAGNETO-DYNAMIC MACHINE, FOR EXAMPLE AN ELECTRIC MOTOR NOT HAVING A COMMUTATOR BUT HAVING SUCH A ROTOR

[75] Inventor: José Garcia, Maurepas, France

[73] Assignee: Valeo Systemes D'Essuyage, Montigny-Le-Bretonneux, France

[21] Appl. No.: 992,573

[22] Filed: Dec. 18, 1992

[30] Foreign Application Priority Data

Dec. 20, 1991 [FR] France .................. 91 15924

[51] Int. Cl.⁵ .................................. H02K 21/12
[52] U.S. Cl. .................................. 310/156; 310/42; 310/68 B; 310/91; 29/598
[58] Field of Search ........... 310/156, 68 B, 42, 67 R, 310/91, 153, 261, 262, 263, 270, 271; 29/598

[56] References Cited

U.S. PATENT DOCUMENTS

| | | | |
|---|---|---|---|
| 1,726,042 | 8/1929 | Reis | 310/153 |
| 3,508,095 | 4/1970 | Knudson et al. | |
| 4,219,752 | 8/1980 | Katou | |
| 4,591,749 | 5/1986 | Gauthier et al. | |
| 4,683,393 | 7/1987 | Stokes | 310/156 |
| 4,700,096 | 10/1987 | Epars | 310/153 |
| 4,899,075 | 2/1990 | Hasebe | 310/68 B |
| 4,906,882 | 3/1990 | Erndt | 310/156 |
| 5,075,605 | 12/1991 | Hendricks | 310/156 |
| 5,089,733 | 2/1992 | Fukuoka | 310/88 B |
| 5,148,070 | 9/1992 | Frye | 310/68 B |

FOREIGN PATENT DOCUMENTS

| | | | |
|---|---|---|---|
| 2827068 | 1/1979 | Fed. Rep. of Germany | H02K 1/28 |
| 3726413 | 2/1989 | Fed. Rep. of Germany | H02K 29/06 |
| 1176490 | 4/1959 | France | |
| 2095149 | 6/1990 | Japan | H02K 1/27 |
| 3128654 | 5/1991 | Japan | H02K 29/08 |
| 3183334 | 8/1991 | Japan | H02K 1/27 |
| 8501160 | 3/1985 | PCT Int'l Appl. | H02K 21/12 |

*Primary Examiner*—R. Skudy
*Attorney, Agent, or Firm*—Morgan & Finnegan

[57] ABSTRACT

A magneto dynamic machine, which may be an electric motor not having a commutator, for example one having electronic commutation, has a permanent magnet rotor comprising a rotor shaft carrying a rotor body, the rotor being provided with permanent magnet elements. The latter consist of a plurality of segments of magnetic material, retained in position by clamping rings engaging around free ends of the magnetic segments. The space between each segment and the next is occupied by a spacing bar.

14 Claims, 4 Drawing Sheets

PERMANENT MAGNET ROTOR, AND A MAGNETO-DYNAMIC MACHINE, FOR EXAMPLE AN ELECTRIC MOTOR NOT HAVING A COMMUTATOR BUT HAVING SUCH A ROTOR

FIELD OF THE INVENTION

The present invention relates to a rotor of the permanent magnet type for an electrical machine, and also to a magneto-dynamic machine, for example an electric motor of a kind not having a commutator but having such a rotor.

BACKGROUND OF THE INVENTION

In the prior art there are proposals for various arrangements for securing permanent magnets on a rotor body of the rotor which includes a rotor shaft and rotates about an axis of rotation defined by the rotor shaft.

DISCUSSION OF THE INVENTION

The present invention provides an improvement on the arrangements disclosed in the prior art. In particular, it permits easier assembly, while also providing novel and advantageous patterns and geometries of magnetic flux.

According to the invention in a first aspect, there is provided a permanent magnet rotor for an electrical malchine, of the type comprising a rotor shaft and a rotor body, characterised in that it includes a plurality of segments located on an engagement face of the rotor body, with the free ends of the said segments being linked by means of clamping rings, and in that the space between each said segment and the next is occupied by a spacing bar. Each magnetic segment constitutes a permanent magnet in contact with the rotor body, the magnetic segments being retained in position on the rotor body by the clamping ring or rings, and being retained in their proper relative positions in the circumferential direction by the spacing bars.

According to the invention in another aspect, a magneto-dynamic machine, for example an electric motor not having a commutator, is equipped with a rotor according to the invention.

The invention is not limited to the embodiments described below, but is applicable in various different forms of magneto-dynamic machine, e.g. a machine of the type having its rotor internal to the stator, or of the type having an external rotor.

The present invention will be more clearly understood on a reading of the description which follows, of preferred embodiments of the invention, and which is given by way of example only and with reference to the accompanying drawings.

DESCRIPTION OF PREFERRED EMBODIMENTS OF THE INVENTION

Figure 1:
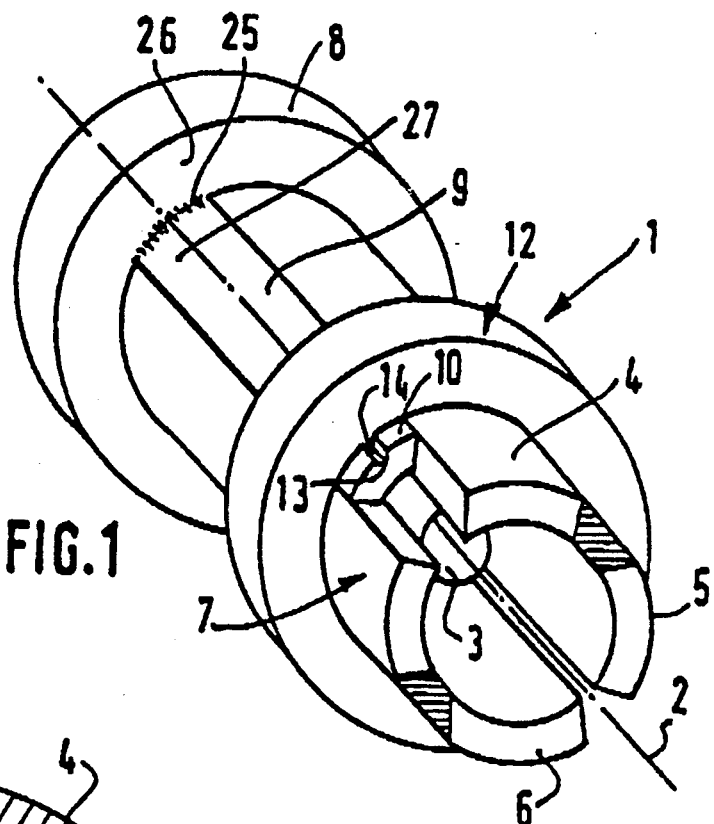
FIG. 1 is a simplified perspective view showing a rotor in one embodiment of the invention.

Referring first to FIG. 1, this shows only a first embodiment of motor in accordance with the invention. In FIG. 1, the rotor I defines an axis of rotation 2 and includes a rotatable rotor shaft 3, only part of which is shown. The rotor 1 also includes a rotor body which is not shown in FIG. 1, but which has disposed on it four magnetic segments or tiles, indicated at 4, 5, 6 and 7 respectively. The outer faces of these segments 4 to 7 constitute alternating north and south poles.

The segments 4 to 7 are located on the rotor body in such a way that a first one of their ends is housed within a first clamping ring 8, or binding hoop, which is disposed at a first end of the stator. The clamping ring 8 is provided with longitudinal spacing elements 9, which are aligned parallel with the axis of rotation 2. Each spacing element 9 has a profile such that it occupies the free space between two of the segments 4 to 7. Each of the spacing elements 9 has an end 10 which is located circumferentially by a second clamping ring 12 or binding hoop. This second clamping ring is fitted after the segments 4 to 7, followed by the spacing bars or elements, have been placed in position, so as to overlie the second or inner end of the segments 4 to 7 and the spacing bars 9.

In one embodiment, the free end 10 of each spacing element is formed with a groove 13, into which a nib 14X formed on the inner periphery of the second damping ring 12, is engaged. This arrangement enables the various components of the rotor to be located with respect to each other for rotation together.

Figure 2:
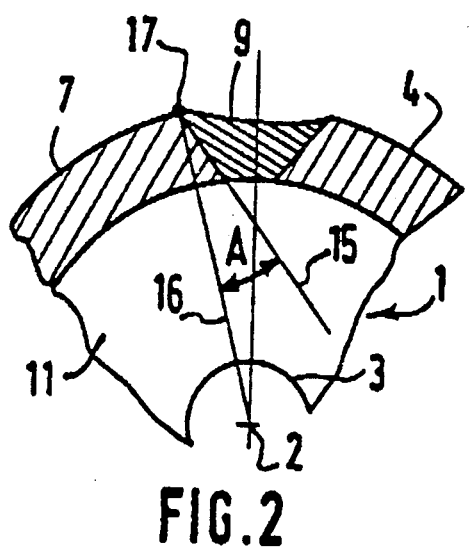
FIG. 2 is a scrap view showing a manufacturing detail of a part of the rotor shown in FIG. 1.

Referring now to FIG. 2, this scrap view is taken in cross section on a central transverse plane of the rotor shown in FIG. 1. The rotor 1 comprises the rotor shaft 3, the rotor body mentioned above (indicated in FIG. 2 at 11), and the magnetic segments 4 to 7. FIG. 2 shows the segments 4 and 7. The material of which the segments 4 to 7 are made may for example be ferrite. Thus, each of the spacing bars or elements 9 lies between two ferrite segments, FIG. 2 showing the bar 9 between the segments 7 and 4. Each spacing bar has a shape which in cross section is substantially that of a trapezium, so that the plane 15 of the flank of the spacing bar which is arranged to make contact with the corresponding flank of the associated segment, for example the segment 7, makes a positive angle A with the radius 16 which joins the corresponding outer edge 17 of the segment to the axis of rotation 2.

As a result, and in particular when the rotor is in rotation, it will be realised that, although centrifugal force will tend to separate the segment 7 from the rotor body 11, this force is resisted by a reaction force exerted by the spacing bar 9, by virtue of its trapezoidal profile defining the angle A with respect to the radius 16.

In the embodiment of rotor shown in FIG. 1, each segment can be retained sufficiently by any suitable profile of the associated spacing bars 9. The arrangement shown in FIG. 2 enables each segment to be retained mechanically along the whole generatrix of the rotor.

Figure 3:
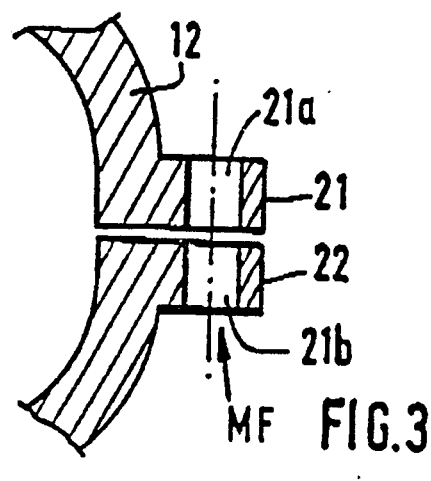
FIG. 3 is a scrap sectional view showing one embodiment of a detail of the rotor shown in FIG. 1.

Referring now to FIG. 3, this shows one embodiment of a binding hoop such as the clamping ring 12 of the rotor in FIG. 1. The hoop 12 comprises a ring of plastics material, which is formed with a radial cut 20 flanked by two outwardly directed lugs 21 and 22. In one embodiment, these lugs are disposed in the plane lying at right angles to the plane of FIG. 3. In such an embodiment, the lugs 21 and 22 do not extend outside the envelope of the hoop. A suitable fastening means for fastening the two lugs 21 and 22 together in clamping relationship, and to hold them closed under pressure around the spacing bars 9 and segments 4 to 7, comprises a fastener (not shown) engaged in holes 21a, 21b formed in the lugs 21 and 22 respectively.

In another embodiment, the clamping rings or hoops are made of a plastics material which contracts on heating. Their initial diameter is such that the segments and/or spacing bars are able to pass easily through the clamping rings, after which the latter are heated so that they shrink, whereby they then exert hoop stresses which retain the components in position.

In FIG. 1, spacing bars 9 are integral with the first clamping ring 8, to which they are joined by articulation means 25 between the inner radial face 26 of the ring 8 and a first end 27 of each spacing bar 9. In this embodiment, the spacing bars disposed between each segment 4 to 7 and the next are joined to only one of the two clamping rings. In order to facilitate assembly, the articulation means 25 comprises an integral hinge. When the clamping ring 8 is made of a plastics material, the articulation means 25 consists of a local line of weakening in the material at the junction between the spacing bar 9 and the radial face 26 of the ring.

A method of assembling the rotor shown in FIGS. 1 to 3 will now be described. The first step is to fit the rotor body 14 on to the rotor shaft 3. In a second step, the clamping ring 8 is first positioned by holding it partly by means of the spacing bars 9. A first end of each segment 4 to 7 is then inserted into the gap within the clamping ring 8 and between two spacing bars 9. The second clamping ring 12 is next positioned and secured, if necessary, by fastening means such as that referred to above with reference to FIG. 3, so as to hold the two lugs 21 and 22 together. In this way, a permanent magnet rotor can easily be made without the magnetic segments being worked.

Figure 4:
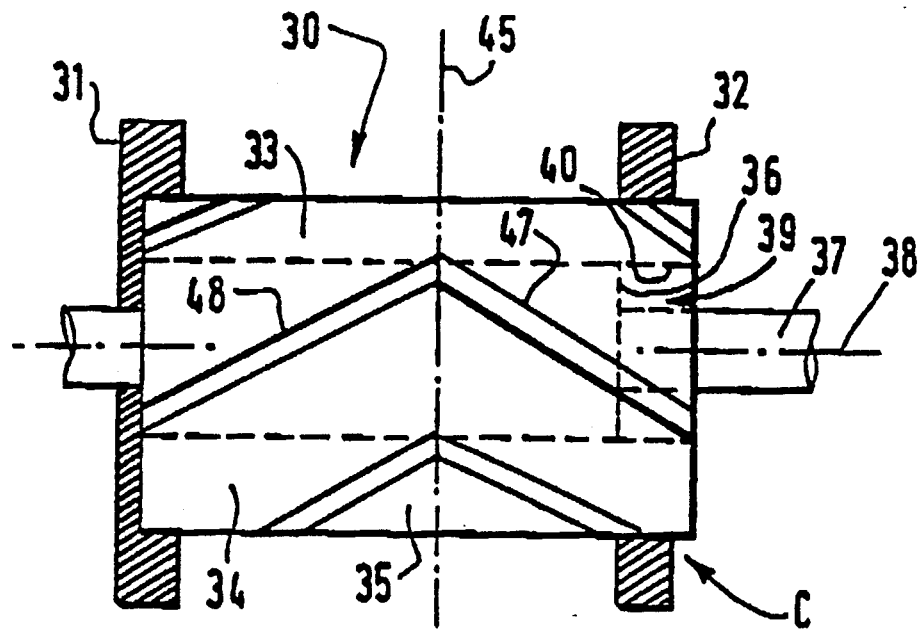
FIG. 4 is a front view showing another embodiment of rotor in accordance with the invention.

Reference is now made to FIG. 4, showing a second embodiment of a rotor in accordance with the invention. In FIG. 4, the rotor 30 comprises a first clamping ring 31 and a second clamping ring 32. The magnetic segments or tiles, for example the segments shown at 33, 34 and 35, are disposed on the rotor body 36. The rotor body is mounted on the rotor shaft 37, and in use, the rotor assembly rotates about its central axis of rotation 38. It will be noted that the magnetic segments 33 to 35 define an end portion, indicated at C in FIG. 4, which is cantilevered so as to define an access space 39. In this arrangement the access space 39 is a free zone which lies between the inner face of each segment (indicated at 40) and the periphery of the shaft 37.

This free zone 39 is provided for the purpose of receiving the working portions of magnetic sensors, in particular Hall effect sensors (not shown). These sensors are fixed on the, rotor and are arranged to detect when the magnetic segments come into a predetermined angular position, whereupon they transmit a signal representing the instantaneous angular position of the rotor during its rotation when the machine is in operation. It will be seen that this is a simple construction for a rotor carrying an indication of its angular position, in which there is no need to add specific means in this connection as has hitherto been necessary.

In another embodiment, the longitudinal edge of each segment is inclined to the direction of the axis of rotation. Each spacing bar is inclined by the same amount, and thus produces the shape of a crooked curve on the outer cylindrical surface of the rotor. Such an inclination has a positive effect on the distribution of the lines of magnetic flux produced by the rotor. When the inclinations of the two longitudinal edges of any one of the segments are equal and correspond to the pitch of the stator slots, in the case where the machine is a magnetodynamic machine which has a stator in which the slots are occupied by stator windings, this reduces the negative effects of the slots.

In a further embodiment, which may be combined with the last mentioned embodiment, the magnetic segments are made in chevron shape. FIG. 4 does in fact show the segments in this shape, with each chevron having an apex which intersects the median transverse plane 45 of the rotor. In the embodiment shown in FIG. 4, the chevron shape enables the axial thrusts between two segments to be balanced.

In yet another embodiment, in order to limit the effects of reluctance torque fluctuation, the rotor is constructed with chevron-shaped segments which are asymmetrical with respect to the median plane 45. In this arrangement the chevron-shaped segments may for example have their opposed inclined edges, 48 and 47 respectively in FIG. 4, either of unequal lengths or of unequal inclinations.

Between two adjacent segments, for example the segments 34 and 35, a spacing bar is arranged in the same way as is shown in FIG. 1 or FIG. 2. In particular, one of the ends of each spacing bar may be joined to the clamping ring 31, or alternatively it may be free.

Figure 5:
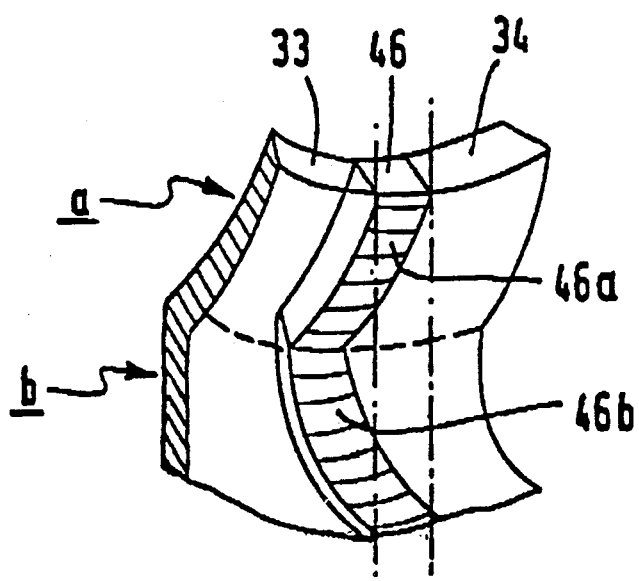
FIG. 5 shows a detail of the rotor of FIG. 4.

Referring now to FIG. 5, this shows diagrammatically one spacing bar for the chevron-shaped segments. As illustrated in FIG. 5 the spacing bar 46 is also chevron-shaped.

FIG. 5 shows part of each of the segments 33 and 34, with the spacing bar 46 between them. The latter has two portions 46a and 46b, on either side a or b of the plane in which the apex of each of the associated chevron-shaped segments lies. A retaining ring may be provided at the separation, i.e. at the apices of the chevron-shaped segments, but this is not absolutely necessary. In particular, the ends of the spacing bar halves may include shortening fastening means for ensuring rigidity of the assembly.

Figure 6:
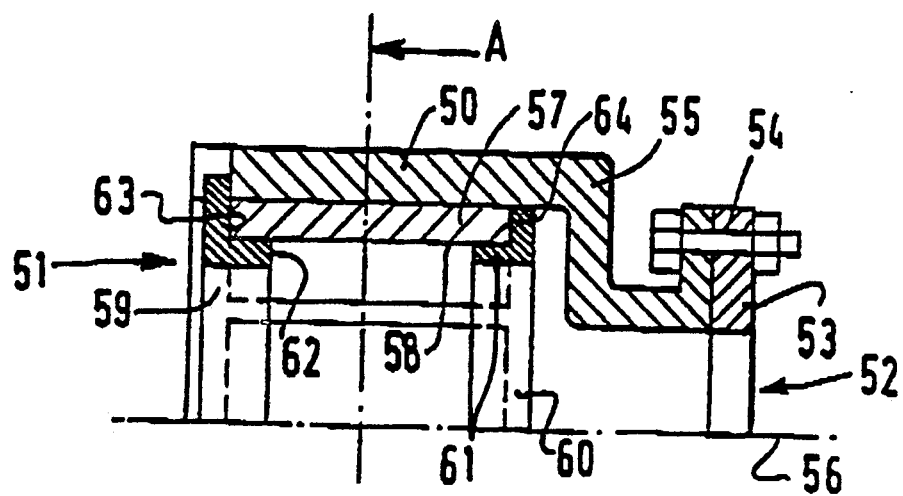
FIG. 6 shows one embodiment of a magneto-dynamic machine in one embodiment of the invention.

Reference is now made to FIG. 6, which shows one embodiment of a magneto-dynamic machine having an external rotor, or thimble rotor. The stator is not shown in FIG. 6, but it is arranged to extend into the interior of the rotor 50 through an aperture 51 in the end of the latter. The other end 52 of the rotor receives a fastening means 53, which is formed with ears 54 by which it is fastened to the rotor shaft (not shown). The rotor body itself is in the form of a cloche or thimble 55.

On its inner face, which is aligned on the axis of rotation 56 of the machine, the rotor body is again provided with segments or tiles made of a permanently magnetised magnetic material, for example a ferrite. One segment 57 is shown in cross section in FIG. 6, and in this embodiment clamping is effected on the internal face 58 of the segment 57. A first clamping ring 59 is accordingly arranged on the side having the aperture 51, while a second clamping ring 60 is similarly arranged on the side nearest to the other end 52 of the rotor. Each of the rings 59 and 60 has a cylindrical portion, 61 and 62 respectively, internally of the rotor, and a second portion 63 and 64 respectively in the form of a disc having a central aperture, so that the stator can be inserted while being fitted in the rotor. In this embodiment the clamping rings 59 and 60 retain the segments on the rotor body without the segments requiring any modification or any machining or forming operation.

Figure 7:
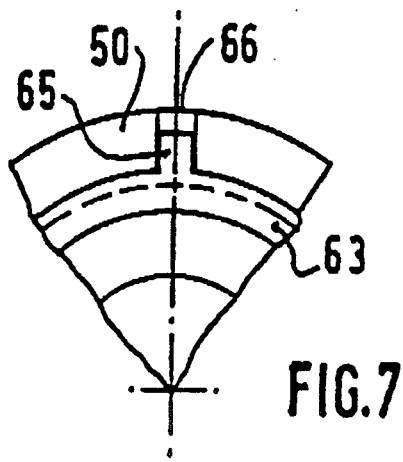
FIG. 7 is an endwise scrap view showing part of the machine in FIG. 6.

Referring now to FIG. 7, this is a partial end view of the rotor of FIG. 6, in which the disc-shaped portion 63 of the clamping ring 59 is formed with a nib 65, which is engaged in a groove or slot 66 formed in the rotor body 50. Such a nib prevents any rotational sliding movement of the assembly of magnetic segments.

Figure 8:
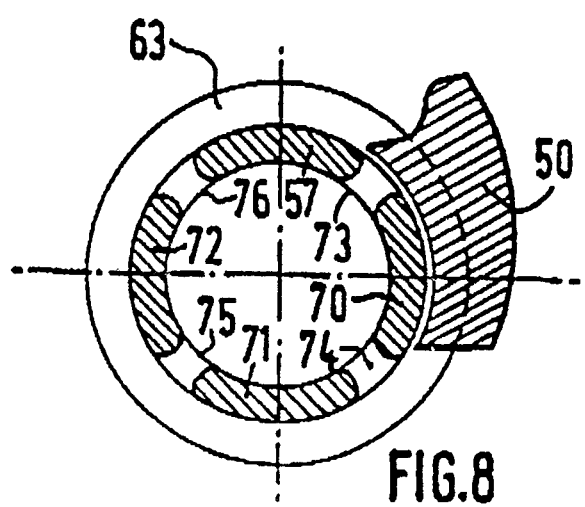
FIG. 8 is a cross section taken on the line A-A in FIG. 6.
Figure 9:
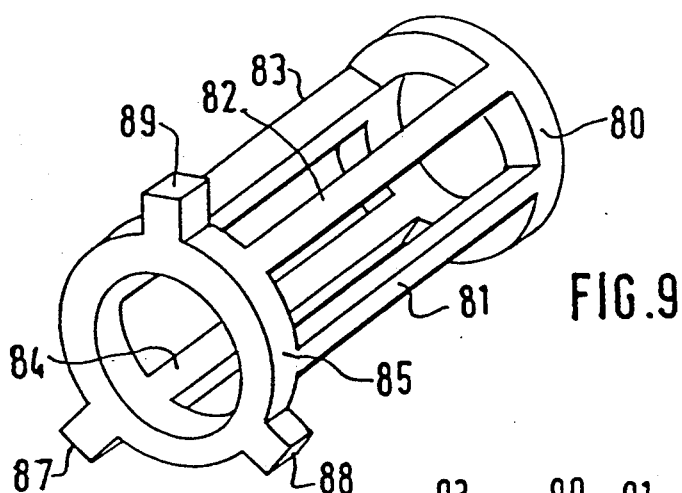
FIG. 9 shows one embodiment of a particular component which is an essential part of the invention.

FIG. 8 shows part of the rotor body 50, with the magnet assembly mounted within the latter, including their clamping means and spacing bars 73, 74, 75 and 76 which provide the separation between the respective magnetic segments or tiles 57, 70, 71 and 72. These spacing bars may be fixed at both ends on to the respective clamping rings 59 and 60 (which are not shown in FIG. 8). In this arrangement the whole may be mounted and introduced into the rotor body 50 during assembly of the motor. FIG. 9 shows one form of a retaining means for retaining the segments in position. In FIG. 9 this retaining means is shown as a single component in the form of a block made by moulding in a plastics material. It comprises a first clamping ring 80 which is intended to lie closest to the base of the rotor, and which is joined, by means of bars 81, 82, 83 and 84 respectively, to a second clamping ring 85 which is intended to lie on the side nearest to the aperture 51 of the external rotor shown in FIG. 6. The clamping ring 85 has a zone which is engaged by the inner face of each segment, together with lugs 87, 88 and 89 respectively. These lugs are arranged to be received in corresponding grooves similar to the groove 66 in FIG. 7, on the input side of the rotor having the aperture 51.

Figure 10:
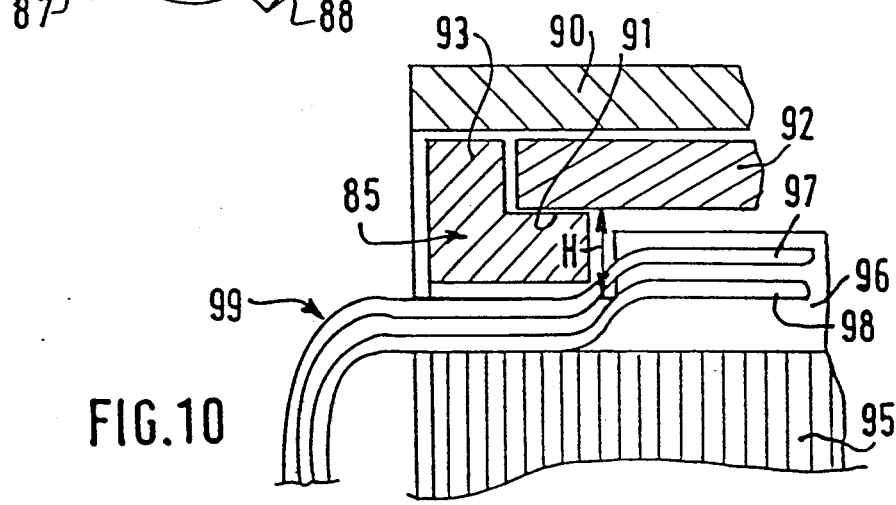
FIG. 10 shows a detail of one embodiment of a magneto-dynamic machine in accordance with the invention.

FIG. 10 shows a small portion of one embodiment of a magneto-dynamic machine having an external rotor generally of the kind described above. FIG. 10 is seen in cross section and shows part of the front portion of the machine. The rotor here comprises a rotor body 90 in which a component such as that shown in FIG. 9 is mounted. In FIG. 10, the clamping ring 85 of this component can be seen. It has an engagement face 91 which engages on the inner face of a respective segment 92, and a disc portion 93 which is in axial abutting relationship against the corresponding face 94 of the segment 91. A stator 95, fitted inside the rotor, has slots 96 containing the stator windings, of which two representative wires are indicated at 97 and 98. The wires of the stator winding pass out of the stator in a bend 99.

The radial depth of the second clamping ring 85 within the bore of the rotor is such that it is difficult to fit a stator within the latter. In one embodiment this thickness, H, is at least equal to the air gap between the rotor and the stator.

In another embodiment, however, this thickness is absent, by virtue of a countersink in the surface that is in facing relationship with the ferrite segments and/or the clamping ring. This embodiment is partly shown in FIG. 11, in which a rotor body 110 comprises at least one permanent magnet segment 111, each end of which is in abutment on the respective clamping rings 112 and 123. A convergent relieved surface, conical in this example and indicated at 114 and 115 respectively, is formed on each of the clamping rings 112 and 123. These surfaces mate with corresponding conical or countersunk surfaces, 116 and 117 respectively, formed on the opposite ends of the ferrite segment 111. In this way the air gap can be reduced to the minimum necessary value.

The clamping ring 123 is extended radially outwardly by at least one lug 119, which penetrates through an aperture 120 so as to prevent relative rotation between the rotor body 110 and the clamping ring 123. This lug 119 can for example be engaged in the aperture 120 with, for example, elastic deformation being provided by a suitable clip.

Figure 11:
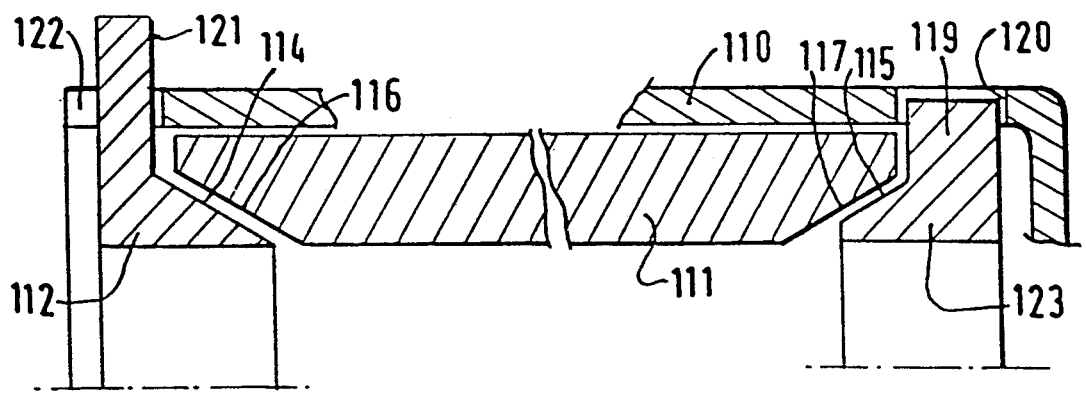
FIG. 11 is a cross section showing part of a magneto-dynamic machine in another embodiment of the invention.

In the front part of the rotor, similarly, the clamping ring 112 is formed with a lug 121 which engages in an aperture formed in the rotor body 110. In FIG. 11, this aperture comprises a notch 122, open outwardly to enable the active magnetic parts of the rotor to be introduced during assembly.

The retaining means which are provided in accordance with the invention, i.e. clamping rings, spacing bars etc., are made of non-magnetic material. In particular they may be made of plastics materials, or of suitable composite materials resistant to the operating temperature of the machine.

What is claimed is:

1. A rotor of the permanent magnet type for a rotary electric machine comprising:
   a rotor shaft;
   a rotor body carried by the rotor shaft and defining an engagement face;
   a plurality of segments of magnetic material having free ends and located on said engagement face of the rotor body; and
   a plurality of clamping rings carried by the rotor body and engaging the free ends of the segments so as to retain the segments in position, said segments defining a space between each segment, the rotor further including a spacing bar disposed in each said space so that a pair of segments is disposed adjacent to each spacing bar, at least one of said clamping rings including a pair of lugs defining a cut between them and a fastener holding the lugs closed together.

2. A rotor according to claim 1, wherein each spacing bar is trapezoidal and so oriented as to apply to its adjacent segments a reaction force against centrifugal force.

3. A rotor according to claim 1, wherein one end of each spacing bar is joined to at least one of the clamping rings.

4. A rotor according to claim 3, further including articulating means joining each spacing bar to said at least one of the clamping rings.

5. A rotor according to claim 3, wherein each spacing bar is integral with said at least one of the clamping rings, said at least one of the clamping rings defining a generally radial face, with each spacing bar being joined to said face through a line of weakening, whereby the spacing bars are articulated to the clamping ring.

6. A rotor according to claim 1, wherein one end of each segment is cantilevered from the rotor body, so as to define a space beyond the rotor body, the rotor being coupled to at least one magnetic sensor for transmitting a signal representing an instantaneous angular position of the rotor disposed in said space.

7. A rotor according to claim 1, wherein the segments are chevron-shaped, each segment defining a first inclined edge, a second inclined edge and an apex the rotor defining a median transverse plane having a pair of sides and each first and second inclined edge being disposed on one side of said median transverse plane.

8. A rotor according to claim 7, wherein said inclined edges are asymmetrical with respect to said median transverse plane.

9. A rotor according to claim 7, wherein the first and second inclined edges of each chevron-shaped segment are of different lengths.

10. A rotor according to claim 7, wherein each spacing bar is chevron-shaped.

11. A rotor according to claim 1, wherein at least one of said clamping rings defines convergent relieved face, each of the segments engaged by said at least one of the clamping rings having a corresponding countersunk face engaging the convergent relieved face of said at least one of the clamping rings.

12. A rotor according to claim 11, wherein the segments are disposed on an internal surface of the rotor, said rotor being hollow.

13. A rotor according to claim 1, wherein the rotor body is formed with a plurality of apertures in axial alignment with each clamping ring, each clamping ring including at least one secured lug engaging one of said apertures.

14. A rotor according to claim 1, having an axis of rotation wherein each segment defines two generally longitudinal edges inclined with respect to the axis of rotation of the rotor.

* * * * *